(12) United States Patent
Armacanqui et al.

(10) Patent No.: US 10,446,832 B2
(45) Date of Patent: Oct. 15, 2019

(54) ALKALINE CELL WITH IMPROVED RELIABILITY AND DISCHARGE PERFORMANCE

(71) Applicant: Spectrum Brands, Inc., Middleton, WI (US)

(72) Inventors: M. Edgar Armacanqui, Madison, WI (US); Wen Li, Madison, WI (US); John Hadley, Madison, WI (US); Matthew Hennek, Stoughton, WI (US)

(73) Assignee: Energizer Brands, LLC, St. Louis, MO (US)

( * ) Notice: Subject to any disclaimer, the term of this patent is extended or adjusted under 35 U.S.C. 154(b) by 88 days.

(21) Appl. No.: 15/543,928

(22) PCT Filed: Jan. 11, 2016

(86) PCT No.: PCT/US2016/012813
§ 371 (c)(1),
(2) Date: Jul. 14, 2017

(87) PCT Pub. No.: WO2016/115016
PCT Pub. Date: Jul. 21, 2016

(65) Prior Publication Data
US 2018/0013133 A1  Jan. 11, 2018

Related U.S. Application Data

(60) Provisional application No. 62/104,265, filed on Jan. 16, 2015.

(51) Int. Cl.
*H01M 4/24* (2006.01)
*H01M 4/42* (2006.01)
(Continued)

(52) U.S. Cl.
CPC .......... *H01M 4/244* (2013.01); *B22F 1/0007* (2013.01); *B22F 1/0014* (2013.01); *H01M 4/12* (2013.01);
(Continued)

(58) Field of Classification Search
CPC ...... H01M 4/244; H01M 10/24; H01M 4/628; H01M 4/42
See application file for complete search history.

(56) References Cited

U.S. PATENT DOCUMENTS

| 4,195,120 A | 3/1980 | Rossler et al. |
| 4,777,100 A | 10/1988 | Chalilpoyil et al. |

(Continued)

FOREIGN PATENT DOCUMENTS

| EP | 2 256 844 | 12/2010 |
| JP | 3136886 B2 | 2/2001 |

OTHER PUBLICATIONS

International Preliminary Report on Patentability for PCT/US2016/012813 dated Jul. 18, 2017 (12 pages).
(Continued)

*Primary Examiner* — Stewart A Fraser
(74) *Attorney, Agent, or Firm* — Foley & Lardner LLP

(57) ABSTRACT

A negative electrode for an alkaline battery cell which includes zinc-based particles, wherein less than 20% of the zinc-based particles, by weight relative to the total zinc in the electrode, have a particle size of greater than about 150 micrometers, is provided. An alkaline electrochemical cell that includes the negative electrode and a method for reducing the gassing of the electrochemical cell is also provided.

14 Claims, 14 Drawing Sheets

(51) Int. Cl.
  *H01M 4/62* (2006.01)
  *H01M 10/24* (2006.01)
  *B22F 1/00* (2006.01)
  *H01M 4/12* (2006.01)
  *H01M 6/50* (2006.01)
  *H01M 6/04* (2006.01)

(52) U.S. Cl.
  CPC .............. *H01M 4/42* (2013.01); *H01M 4/62* (2013.01); *H01M 4/628* (2013.01); *H01M 6/5072* (2013.01); *H01M 10/24* (2013.01); *H01M 6/04* (2013.01)

(56) References Cited

U.S. PATENT DOCUMENTS

| | | | |
|---|---|---|---|
| 5,814,419 A | 9/1998 | Kenyon et al. | |
| 7,226,696 B2 | 6/2007 | Ndzebet et al. | |
| 8,343,658 B2 | 1/2013 | Sumiyawa et al. | |
| 8,728,659 B2 | 5/2014 | Armacanqui et al. | |
| 2004/0187640 A1* | 9/2004 | Melzer | B22F 1/0014 75/255 |
| 2004/0197656 A1* | 10/2004 | Durkot | H01M 2/0272 429/229 |
| 2007/0141467 A1 | 6/2007 | Durkot et al. | |
| 2007/0166620 A1* | 7/2007 | Issaev | H01M 4/244 429/232 |
| 2008/0193851 A1* | 8/2008 | Armacanqui | H01M 4/244 429/300 |
| 2008/0213654 A1 | 9/2008 | Fensore | |
| 2008/0241683 A1* | 10/2008 | Fensore | H01M 4/06 429/206 |
| 2009/0263728 A1* | 10/2009 | Zuraw | B22F 9/10 429/344 |
| 2010/0233533 A1* | 9/2010 | Ndzebet | H01M 4/244 429/206 |
| 2014/0205909 A1* | 7/2014 | Yonehara | H01M 4/42 429/302 |

OTHER PUBLICATIONS

International Search Report and Written Opinion for PCT/US2016/012813 dated May 13, 2016 (17 pages).

Search report issued for EP application 16737663.1, dated Jun. 8, 2018.

Office Action on European Application No. 16737663.1 dated Feb. 8, 2019. 4 pages.

* cited by examiner

FIG. 12 Zinc Particle Aspect Ratio

FIG. 13 Optical Image of >150 Micrometer Zinc Fraction Showing a High Aspect Ratio

ALKALINE CELL WITH IMPROVED RELIABILITY AND DISCHARGE PERFORMANCE

This application is a U.S. national phase application under 35 U.S.C. § 371 of International Application No. PCT/US2016/012813, filed on Jan. 11, 2016, which claims the benefit of U.S. Provisional Application No. 62/104,265, filed Jan. 16, 2015, the entire contents of which are hereby incorporated by reference in their entireties.

FIELD

The present technology is generally related to the field of zinc anodes for electrochemical cells. In particular, the technology is related to zinc anodes with improved reliability and discharge performance.

BACKGROUND

Battery gassing is a normal occurrence during charging and storage of batteries. Additionally, hydrogen gas generated during corrosion reactions can increase the internal cell pressure, causing electrolyte leakage and disrupting of the cell integrity. This process is known as "gassing." Gas generation in alkaline batteries during storage is a result of hydrogen formation in the anode compartment driven by reduction reactions on metallic impurities present in the anode. It is enhanced after partial discharge because the discharge removes the protective surface oxide film. Metallic impurities are inherent to the anode material as contaminants and can also originate from other battery materials such as the cathode, graphite, electrolyte, current collector, or other additives used in the making of alkaline batteries. These impurities may be localized or randomly distributed.

Gassing can lead to several problems in a battery. For example, gassing raises safety concerns due to the explosive hydrogen gas buildup produced. Gassing also causes the consumption of active zinc material, thereby permanently reducing battery capacity. Additionally, gassing also consumes the water in the battery, which is needed for cathode reduction reactions, thereby further decreasing battery capacity. Proposed remedies to offset gassing related problems include designing battery cells with safety vents which will release gas in the event of a pressure buildup, employing corrosion-resistant materials, adding gassing inhibitors or corrosion inhibitors, and minimizing the presence of metallic impurities in the battery cell. The hydrogen gas generated during corrosion reactions leads to internal cell pressure build-up and, ultimately, to electrolyte cell leakage. Organic and inorganic inhibitors commonly used to suppress hydrogen gas generation during storage can drastically suppress discharge performance, making their benefit impractical.

SUMMARY

In one aspect, an electrode for an electrochemical cell is provided which includes zinc-based particles, wherein less than 20% of the zinc-based particles, by weight relative to the total zinc in the electrode, have a particle size of greater than about 150 micrometers.

In another aspect, an electrode for an electrochemical cell is provided which includes zinc-based particles, wherein about 10% to about 20%, by weight relative to the total zinc in the electrode, have a particle size of greater than about 150 micrometers.

In one aspect, a gelled anode mixture is provided which includes zinc-based particles, wherein less than 20% of the zinc-based particles, by weight relative to the total zinc in the electrode, have a particle size of greater than about 150 micrometers; a gelling agent; an alkaline electrolyte; and a surfactant.

In one aspect, a method for reducing the gassing of an electrochemical cell subject to gassing is provided, wherein the method includes utilizing as the active anode of said cell, a gelled anode including zinc-based particles wherein less than 20% of the zinc-based particles, by weight relative to the total zinc in the electrode, have a particle size of greater than about 150 micrometers.

DETAILED DESCRIPTION

Figure 1:
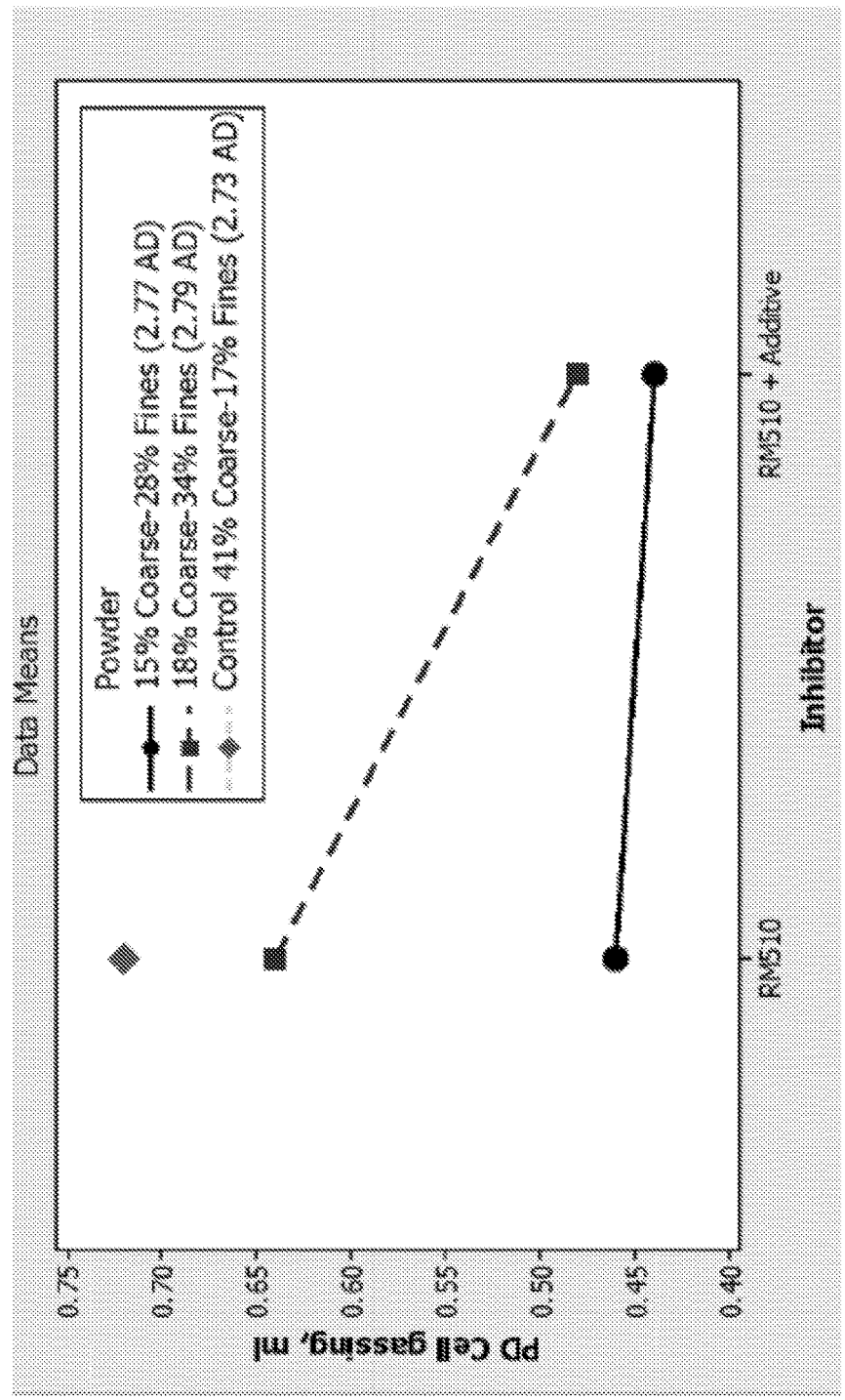
FIG. 1 illustrates the gassing characteristics of a LR6 electrochemical cell caused by the content of coarse and fine zinc-based particles having an apparent density of between about 2.73 and about 2.79 g/ml.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Ratio, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

As used herein, the term "zinc anode" refers to an anode that includes zinc as an anode active material.

As used herein, "fines" are particles passing through a standard 200 mesh screen in a normal sieving operation (i.e., with the sieve shaken by hand). "Dust" consists of particles passing through a standard 325 mesh screen in a normal sieving operation. "Coarse" consists of particles not passing through a standard 100 mesh screen in a normal sieving operation. Mesh sizes and corresponding particle sizes as described here apply to a standard test method for sieve analysis of metal powders which is described in ASTM B214.

As used herein, "aspect ratio" refers to the dimension determined by the ratio between the length of the longest dimension of the particle and the relative width of the particle.

Alkaline batteries have been improved over the years to enhance their discharge capability as well as to improve their reliability. For instance, a known practice in the art to improve high rate discharge performance in alkaline batteries is to increase the content of fine zinc anode particles, particles passing 200 mesh screen size (75 μm). This approach generally results in enhanced cell gassing because of the corresponding enlarged anode surface area from the added fraction of fine particles. To control cell reliability, a common practice in the art is to use organic and/or inorganic gassing inhibitors. Also, the anode zinc powder can be conveniently alloyed with well-known inhibiting alloying elements.

Zinc anode gels of alkaline electrochemical cells are prone to electrochemical corrosion reactions when the battery cells are stored in the undischarged or partial discharged condition due to zinc anode corrosion, an oxidation reaction leading to zinc dissolution and formation of zincate, as shown in (1). This reaction is balanced by a cathode reaction leading to hydrogen generation, as shown in (2), which results in internal cell gas pressure buildup during storage. The rate of the gas generating reaction is determined by some factors such as available active zinc surface area, the presence of metallic impurities, gel KOH concentration, and the nature of the native oxide film on the zinc surface. Surface area is impacted by the zinc particle size distribution, particle shape, and particle surface morphology. Metallic impurities are inherent to the anode material as contaminants and can originate also from other battery materials such as the cathode, the graphite, the electrolyte, the anode current collector, the metal battery housing, and from other additives used in the making of alkaline batteries. The native oxide film on zinc protects its surface from oxidation if the battery cells are stored in the undischarged condition. However, partial discharge removes the compact protective surface oxide film and exposes metallic impurities to the corroding electrolyte.

$$Zn + 4OH^- \rightarrow Zn(OH)_4^{2-} + 2e^- \quad (1)$$

$$2H_2O + 2e^- \rightarrow H_2 + 2OH^- \quad (2)$$

Two effective methods to improve high rate cell discharge performance are anode surface enlargement and the use of low KOH concentrations in the anode gel. The performance benefits of adjusting KOH concentration have been demonstrated in document 1 (U.S. Pat. No. 7,226,696 B2). Document 1 recognizes that cell performance is enhanced using gel KOH concentrations below 34%, such as below 30% or below 28%, generally at the expense of increased cell gassing. Similarly, high rate discharge performance can be improved by increasing the content of zinc fine particles, that is, particles passing 200 screen size, as reported in Document 2 (U.S. Pat. No. 8,343,658 B2). The simultaneous adjustments to the zinc particle size and content of zinc fines as well as to the anode gel KOH concentration to enhance discharge performance can be expected to also result in excessive cell gas generation, compromising cell reliability. Thus, it is desirable to find means to suppress cell gas generation in battery cells having increased percentage of fine particles and optimized levels of gel KOH concentrations. It is an objective of the present invention to present means to counteract the adverse gassing effects of using high percentage of zinc fine particles and optimized anode gel KOH concentrations Zinc powders for alkaline batteries typically contain particles having a wide distribution of particle sizes and ranging from a few micrometers to more than 1000 micrometers (μm). The particle size distribution contains different weight percentages of particles smaller than 45 μm (dust), particles smaller than 75 μm (fines), particles greater than 150 μm (coarse), and particles at sizes between 75 μm and 150 μm. In some embodiments, the coarse particles include particles having a size of about 150 μm to about 1000 μm, 150 μm to about 177 μm, about 177 μm to about 354 μm, about 354 μm to about 707 μm, about 707 μm to about 2500 μm, about 2500 μm to about 6730 μm, and ranges between any two of these values or less than any of these values. The zinc-based particles may be of various shapes including, but not limited to, spherical like, dog bone, acicular, and elongated type. The particle shape can also be defined by the corresponding aspect ratio, a dimension determined by the ratio between the length of the longest dimension of the particle and the relative width of the particle. Conventional zinc powders contain particles having a wide distribution of particle sizes ranging from a few microns to more than 1000 microns, with the weight distribution being the heaviest with particles greater than 150 microns. Cells having such conventional zinc powders have sufficient electrolyte amounts and KOH concentration to provide OH ions and water which is consumed in corrosion reactions during storage, as described above. Additions of relatively large quantities of organic and/or inorganic inhibitors are generally used to suppress undesirable reactions that can lead to gas generation during shelf storage.

It has now been found here that by controlling the particle size distribution, particularly by minimizing the content of coarse particles of zinc-based particles, used as anode material in batteries, provides for improvements in the reliability and discharge performance of such batteries. It is believed that this effect is provided by reducing the gassing of the battery during storage.

Accordingly, in one aspect, a negative electrode for an alkaline battery cell is provided, wherein the content of coarse particles is less than 20% of the zinc-based particles, by weight relative to the total zinc in the electrode, that is, less than 20% of the zinc-based particles, by weight relative to the total zinc in the electrode, have a particle size of greater than about 150 micrometers. This includes embodiments wherein less than 18%, less than 15%, less than 12%, less than 10%, less than 8%, or less than 5% of the zinc-based particles, by weight relative to the total zinc in the electrode, have a particle size of greater than about 150 micrometers.

In some embodiments, the negative electrode includes zinc-based particles wherein about 1% to about 30% of the zinc-based particles, by weight relative to the total zinc in the electrode, are coarse particles having a particle size of greater than about 150 micrometers. This includes embodiments wherein about 5% to about 25%, about 8% to about 22%, about 10% to about 20%, or about 12% to about 18%, and ranges between any two of these values or less than any of these values, of the zinc-based particles, by weight relative to the total zinc in the electrode, have a particle size of greater than about 150 micrometers. In some embodiments, about 0.1% to about 2%, about 2% to about 6%, about 4% to about 9%, or about 5% to about 10%, of the zinc-based particles, by weight relative to the total zinc in the electrode, have a particle size of greater than about 150 micrometers. In some embodiments, less than 20% of the zinc-based particles, by weight relative to the total zinc in the electrode, have a particle size of greater than about 150 micrometers. In some embodiments, about 10% or more of the 20% zinc-based particles, have a particle size between about 150 micrometers to 177 micrometers. In some embodiments, about 10% of the 20% zinc-based particles have a particle size between about 150 micrometers to 177 micrometers.

In some embodiments, the zinc-based particles are zinc alloy particles. The zinc alloy may include alloying elements intended to raise the over-potential for hydrogen evolution to minimize its formation at cathode sites. In some embodiments, the zinc may be alloyed with one or more metals selected from indium, bismuth, calcium, aluminum, lead, and phosphorous. In some embodiments, the alloying metal is bismuth. The concentrations of the metals alloyed with zinc may range from about 20 ppm to about 750 ppm. In some embodiments, the alloying metals are present at a concentration of about 50 ppm to 550 ppm. Typically, alloy powders may include from about 0.01% to about 0.5% by weight alloy agent alone, or in combination with, from about 0.005% to about 0.2% by weight of a second alloying agent such as lithium, calcium, aluminum, and the like.

The zinc-based particles may have an average particle size of about 70 micrometers to about 175 micrometers. This includes an average particle size of about 75 micrometers, about 80 micrometers, about 85 micrometers, about 90 micrometers, about 100 micrometers, about 110 micrometers, or about 120 micrometers. In some embodiments, the zinc-based particles are zinc alloy particles have an average particle size of about 90 micrometers.

In addition to controlling the content of the coarse particles, the amount of fines and dust can also be optimized to achieve the desired reduction in gassing and improvement in discharge properties. Thus, in one embodiment, about 10% to about 90% of the zinc-based particles, by weight relative to the total zinc in the electrode, have a particle size of less than about 75 micrometers. This includes embodiments wherein about 15% to about 80%, about 20% to about 70%, about 30% to about 60%, or about 40% to about 50%, and ranges between any two of these values or less than any of these values, of the zinc-based particles, by weight relative to the total zinc in the electrode, have a particle size of less than about 75 micrometers. In some embodiments, about 20% to about 70% of the zinc-based particles, by weight relative to the total zinc in the electrode, have a particle size of less than about 75 micrometers. In other embodiments, about 20% to 45% by weight relative to the total zinc in the electrode have a particle size of less than about 75 micrometers. In some embodiments, about 20% to about 40% of the zinc-based particles, by weight relative to the total zinc in the electrode, have a particle size of less than about 75 micrometers. In some embodiments, about 1% to about 15% by weight relative to the total zinc in the electrode has a particle size of less than 45 micrometers. In other embodiments, about 1% to about 10% by weight relative to the total zinc in the electrode has a particle size of less than about 45 micrometers. In other embodiments, about 1% to about 7% by weight relative to the total zinc in the electrode has a particle size of less than about 45 micrometers.

In some embodiments, less than 20% of the zinc-based particles, by weight relative to the total zinc in the electrode, have a particle size of greater than about 150 micrometers and about 20% to about 70% of the zinc-based particles, by weight relative to the total zinc in the electrode, have a particle size of less than about 75 micrometers. In some embodiments, about 1% to 15% by weight relative to the total zinc in the electrode have a particle size of less than about 45 micrometers, about 20% to 50% by weight relative to the total zinc in the electrode have a particle size of less than about 75 micrometers, and about 10% to 20% by weight relative to the total zinc in the electrode have a particle size of greater than about 150 micrometers. In other embodiments, less than 10% of the zinc-based particles, by weight relative to the total zinc in the electrode, have a particle size of greater than about 150 micrometers and about 20% to about 70% of the zinc-based particles, by weight relative to the total zinc in the electrode, have a particle size of less than about 75 micrometers. In some embodiments, about 4% to about 9% of the zinc-based particles, by weight relative to the total zinc in the electrode, have a particle size of greater than about 150 micrometers and about 20% to about 70% of the zinc-based particles, by weight relative to the total zinc in the electrode, have a particle size of less than about 75 micrometers. In some embodiments, between 10% and 20% by weight of the particles have a particle size greater than 150 micrometers and more than 20% by weight of the particles have a particle size smaller than 75 micrometers. In other embodiments, between 10% and 20% by weight of the particles have a particle size greater than 150 micrometers and between 20% and 50% by weight of the particles have a particle size smaller than 75 micrometers. In some embodiments, between 4% and 9% by weight of the particles have a particle size greater than 150 micrometers and more than 20% by weight of the particles have a particle size smaller than 75 micrometers.

Figure 12:
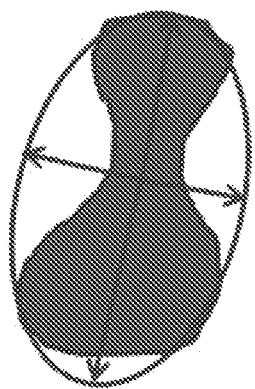
FIG. 12 illustrates the aspect ratio concept.
Figure 13:
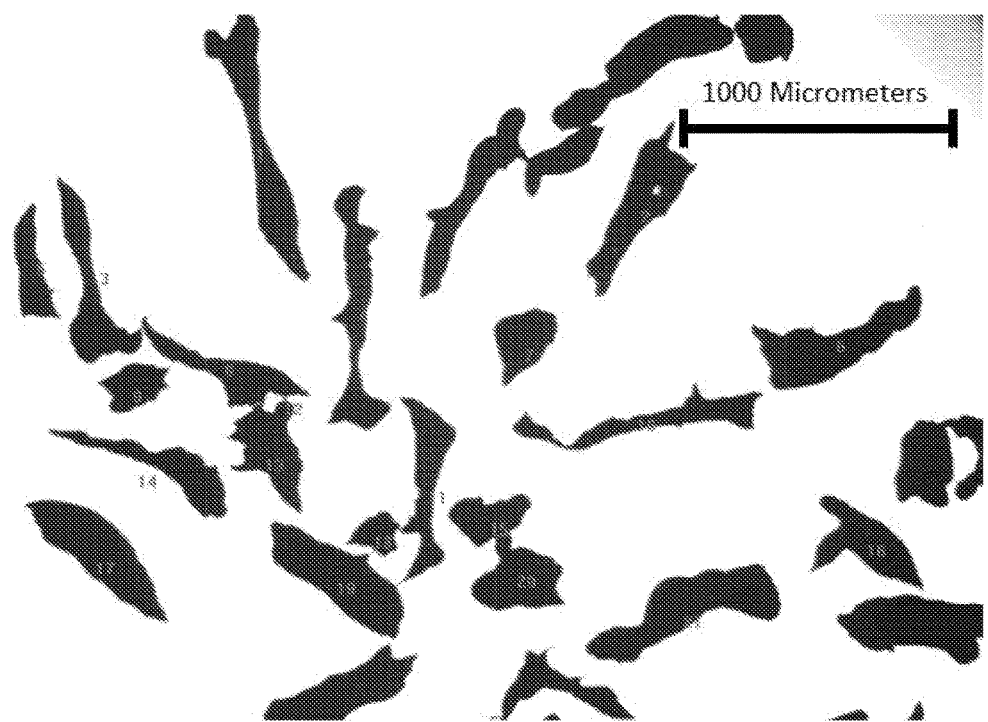
FIG. 13 illustrates the elongated nature and the high aspect ratio of coarse particles of sizes greater than 150 micrometers.

The level of elongation of differing particle size fractions impacts the interlocking of zinc anode particles and may be measured optically. Images of several hundred zinc-based particles of each individual sieve fraction may be imported to software that have the ability to optically measure large numbers of these particles. Mathematical functions may be applied to the optical images of the zinc fractions to quantify the level of particle elongation. Aspect ratio, as defined a function of the ratio between major axis and minor axis of ellipse equivalent to the object (FIG. 12), may be determined for each particle in a given fraction and the mean average of the aspect ratio for each zinc sieve fraction may be calculated. An average aspect ratio of 1 implies that on average the particles are spherical. Any value greater than 1 implies some level of elongation. In addition to aspect ratio, zinc particle roundness, as defined as a function of the perimeter squared divided by four time the value pi times the particles area ($f_{roundness} = P2 \div 4\pi A$). An average roundness of 1 implies that on average the particles are spherical. Coarse particles with a high aspect ratio or roundness function provide an enhanced level of particle-to-particle contact. FIG. 13 demonstrates the elongated nature of the coarse particles greater than 150 microns.

The zinc-based particles of the present technology have a high aspect ratio. In some embodiments, the zinc-based particles have an aspect ratio of about 5 or less, about 4.5 or less, about 4 or less, about 3 or less, about 2.5 or less, about 2 or less, or about 1.5 or less. In some embodiments, the zinc-based particles of the present technology have an aspect ratio of from about 1 to about 5. This includes an aspect ratio of about 1 to about 5, from about 1.5 to about 4.5, from about 1.8 to about 4.2, from about 2 to about 4.0, from about 2.5 to about 3.5, or about 2.8 to about 3.8, and ranges between any two of these values or less than any of these values. In some embodiments, the zinc-based particles have an aspect ratio of from about 1.85 to about 4.15.

The zinc-based particles of the present technology have a roundness of at least about 0.8. This includes a roundness of at least about 0.9, at least about 1.0, at least about 1.2, at least about 1.5, at least about 1.8, or at least about 2.0. In some embodiments, the zinc-based particles have a roundness of at least about 1.5.

In some embodiments, the zinc-based particles have an apparent density of about 1.5 g/cm$^3$ to about 4.5 g/cm$^3$. This includes an apparent density of about 1.8 g/cm$^3$ to about 4.0 g/cm$^3$, about 2.0 g/cm$^3$ to about 3.8 g/cm$^3$, about 2.5 g/cm$^3$ to about 3.5 g/cm$^3$, or about 2.8 g/cm$^3$ to about 3.0 g/cm$^3$, and ranges between any two of these values or less than any of these values. In some embodiments, the zinc-based particles have an apparent density of about 2.40 g/cm$^3$ to about 3.15 g/cm$^3$.

In some embodiments, the negative electrode or anode is a gelled anode. A suitable gelled anode according to the technology may include a metal alloy powder such as a zinc alloy optionally with other components such as a gelling agent, surfactants, super-absorbents, inhibitor additives, and an alkaline electrolyte. In one aspect, a gelled anode mixture is provided, which includes zinc-based particles, wherein less than 20% of the zinc-based particles, by weight relative to the total zinc in the electrode, have a particle size of greater than about 150 micrometers; a gelling agent; an alkaline electrolyte including a hydroxide material; and a surfactant.

Any suitable gelling agent may be used so long as it does not depart from the scope of the present disclosure. Suitable gelling agents include, but are not limited to, polyacrylic acids, grafted starch materials, salts of polyacrylic acids, crosslinking-typed branched polyacrylates, carboxymethyl cellulose, natural gum, and the like or combinations thereof. Examples of suitable polyacrylic acids include Carbopol 940 and 934 (available from B.F. Goodrich) and Polygen 4P (available from 3V). An example of a salt of a polyacrylic acid is Alcosorb G1 (available from Ciba Specialties). An example of a grafted starch material is Waterlock A221 (available from Grain Processing Corporation). In one embodiment, a suitable gelling agent is a polyacrylic acid polymer. In one embodiment, the polyacrylic acid is a cross-linked polyacrylic acid polymer. In some embodiments, the gelling agent is an agent other than the sodium polyacrylate gelling agent. In some embodiments, the gelling agent does not include sodium polyacrylate gelling agent. A gelled anode mixture, a gelled anode, and an electrochemical cell containing the gelled anode can have the structures of and may be prepared as described in U.S. Pat. No. 8,728,659 B2, incorporated by reference herein as if set for in its entirety.

The amount of gelling agent may range from about 0.05% to about 5% of the total mass of the anode. In some embodiments, the gelling agent is present in an amount from about 0.1% to about 1% of the total mass of the anode. In one embodiment, the gelling agent may be present in an amount from about 0.1% to about 0.8%, about 0.2% to about 0.7, or about 0.3% to about 0.6%, based upon the total weight of the anode gel.

Along with the anode active, the anode may include an electrolyte therein to provide water for the galvanic corrosion reaction. The electrolyte desirably has high ionic conductivity. Generally, the electrolyte is an alkaline electrolyte, such as aqueous solution of an alkali metal hydroxide, but can also include other electrolytes known to those of ordinary skill in the art, e.g., quaternary ammonium electrolytes. Examples of alkali metal hydroxide include potassium hydroxide, lithium hydroxide or sodium hydroxide solution. In some embodiments, the alkali metal hydroxide is potassium hydroxide.

The anode including the zinc-based particles of the present technology provides optimum performance even with an electrolyte having low hydroxide concentration. For example, the concentration or content of hydroxide in the electrolyte may be from about 1 wt % to about 60 wt %. This includes from about 5 wt % to about 50 wt %, from about 10 wt % to about 45 wt %, from about 15 wt % to about 40 wt %, from about 20 wt % to about 35 wt %, and from about 25 wt % by weight to about 30 wt % by weight, and ranges between any two of these values or less than any one of these values. In some embodiments, the gelled anode has hydroxide content from 20 wt % to 34 wt %. In some embodiments, the gelled anode has a hydroxide content of less than about 60 wt %. This includes a hydroxide content of less than about 50 wt %, less than about 40 wt %, less than about 30 wt %, less than about 20 wt %, and less than about 10 wt %.

In some cases, the electrolyte may contain dissolved salts, oxides or hydroxides of bismuth, tin, indium, mercury, lead, cadmium, or thallium. Additionally, the electrolyte may include a dissolved cation or anion of the metal anode (e.g., an aluminum oxide, sodium aluminate, potassium aluminate, a zinc oxide, a zinc hydroxide, or calcium salts.) In some embodiments, the electrolyte may additionally contain a corrosion inhibitor such as a quaternary ammonium salt, or a non-ionic, anionic, or cationic surfactant. In some embodiments, when zinc is the anode active agent, the electrolyte may include a small amount of zinc oxide to impede open circuit oxidation and stabilize the zinc surface and reduce gassing. Zinc oxide may be present in an amount from about 1% to about 10%, by weight of the anode. This may include about 1% to about 8% or 1% to about 5%, by weight of the anode. In one embodiment, the zinc oxide may be present in an amount of about 1%, about 1.5%, about 2%, about 2.5%, about 3%, about 3.5%, or about 4%, by weight of the anode, and ranges between any two of these values or less than any of these values. In some embodiments, the amount of zinc oxide may be from about 0.1% by weight of the anode to about 2% by weight of the anode. In one embodiment, the zinc oxide may be present in an amount of about 2%, by weight of the anode.

In addition to the electrolyte, organic surfactants and inorganic corrosion-inhibiting agents may also be added to the anode. It is believed that the surfactants act at the anode-electrolyte interface by forming a hydrophobic film that protects the anode active surface during storage. The inhibitive efficiency of surfactants to increase the corrosion resistance of the anode active depends on their chemical structure, concentration, and their stability in the electrolyte. Exemplary surfactants include organic phosphate esters such as the ethylene oxide-adduct type disclosed by Rossler et al. in U.S. Pat. No. 4,195,120, or surface-active heteropolar ethylene oxide additive including organic phosphate esters disclosed by Chalilpoyil et al. in U.S. Pat. No. 4,777,100, both incorporated herein by reference, an amphoteric surfactant, sulfonated or sulfated organic acid surfactant, diethylenetriamine, hexyl diphenyl oxide sulfonic acid, and commercially available surfactants such as Rhodafac RM-510, Rhodafac RA-600, Rhodafac RS-610, Witconate 1840X, and Mafo 13 MOD1, or a combination of any two or more thereof. In some embodiments, the surfactant may include an amphoteric fluorosurfactant such as e.g., CHEMGUARD® S-111, CHEMGUARD® S-500, CAPSTONE® FS-50, CAPSTONE® FS-51, APFS-14, DYNAX DX3001, ZONYL® FSK, ZONYL® FS-500, or a combination of any two or more thereof. In some embodiments, the combination of the components in the anode provides for an enhanced improvement in cell voltage and cell performance. In some embodiments, the surfactant is an organic phosphate ester surfactant, a polyethylene glycol ether, an ethoxylated alkylphenol, a tallow amines, diethylenetriamine, an amphoteric surfactant, a sulfonated organic acid surfactant, a sulfated organic acid surfactant, hexyl diphenyl oxide sulfonic acid, or a combination of any two or more thereof.

The surfactant may be present in an amount of from about 1 ppm to about 400 ppm. This includes from about 5 ppm to about 300 ppm, from about 10 ppm to about 150 ppm, from about 20 ppm to about 100 ppm, or about from about 25 ppm to about 50 ppm, and ranges between any two of these values or less than any one of these values. The total amount of surfactant typically ranges from about 0.0001% to about 10% by weight of the anode. This includes from about 0.005% to about 5% by weight, about 0.001% to about 1% by weight, about 0.005% to about 0.1% by weight, or about 0.01% to about 0.5% by weight, by weight of relative to the weight of the anode, and ranges between any two of these values or less than any one of these values. In some embodiments, the total amount of surfactant may range from about 0.001% to about 0.04% by weight of the anode.

Diluted solutions of potassium hydroxide are generally added to the anode gel, the cathode, and the paper separator. The KOH solution added to the paper separator is done in advance to pouring the anode gel into the anode compartment to allow soak up of this electrolyte, also called pre-wet, by the separator and the cathode material in contact with the battery housing. The KOH concentration present in the anode gel, the pre-wet, and the cathode material can have an impact on the discharge rate capability of the battery cell.

Other inhibiting additives such as for example, indium hydroxide or silicates, such as sodium silicates, may also be present in the electrolyte solution. The amount of inhibitor added to the cell may be expressed as a function of the weight of metal (e.g., zinc) in the anode or the weight of the anode gel, as done in the examples discussed below. RM-510 is preferably added in the range of 0.0004% to 0.015% relative to the weight of the gelled anode, and more preferably between 0.0001% and 0.0075%. Indium hydroxide is preferably added at concentrations ranging from 0.003% to 0.03%. Such additives or inhibitors may be added to the gelled anode mix either alone or in combination in accordance with any of the embodiments described in this disclosure, unless otherwise specified.

The technology provides a gelled anode having yield stress of greater than about 500 $N/m^2$. This includes yield stress of from about 500 $N/m^2$ to about 4000 $N/m^2$, from about 600 $N/m^2$ to about 3500 $N/m^2$, from about 1000 $N/m^2$ to about 2500 $N/m^2$, or of about 1500 $N/m^2$ to about 2000 $N/m^2$, and ranges between any two of these values or less than any one of these values. In some embodiments, the gelled anode has a yield stress value of about 600 $N/m^2$ to about 3500 $N/m^2$.

The gelled anode materials have a suitable viscosity required to provide the enhance cell discharge performance. For example, the viscosity may be from about 10,000 cps to about 200,000 cps, from about 25,000 cps to about 150,000 cps, or from about 50,000 cps to about 100,000 cps, and ranges between any two of these values or less than any one of these values, at about 25° C. In some embodiments, the gelled anode material has a viscosity of about 25,000 to 150,000 cps at 25° C.

The gelled anode of the disclosed embodiments may be included as a component in a conventional electrochemical cell such as batteries. These include, for example, galvanic cells, such as in metal-air cells, e.g., zinc-air cell, as well as alkaline cylindrical cells, e.g., zinc-metal oxide cell. Metal-air cells which include the anode described herein may usefully be constructed as button cells for the various applications such as hearing aid batteries, and in watches, clocks, timers, calculators, laser pointers, toys, and other novelties. It shall be understood, however, that the present technology has application to electrochemical cells other than button cells. For example, the anode may find application in any metal air cell using flat, bent, or cylindrical electrodes. Among the cylindrical metal-metal oxide cells and metal-air cells, the anode material is applicable to those shaped for AA, AAA, AAAA, C, or D cells. Use of the anode material as components in other forms of electrochemical cells is also contemplated.

Accordingly, in one aspect, provided is an alkaline cylindrical electrochemical cell which includes a positive current collector; a cathode in contact with the positive current collector; a negative current collector; an anode in contact with the negative current collector, wherein the anode includes a gelled mixture including zinc-based particles; and a separator between the cathode and the anode. In some embodiments of the electrochemical cell, less than 20% of the zinc-based particles, by weight relative to the total zinc in the gelled anode mixture, are coarse particles and have a particle size of greater than about 150 micrometers. In other embodiments, the electrochemical cell includes a zinc anode wherein about 10% to about 20% of the zinc-based particles, by weight relative to the total zinc in the electrode, have a particle size of greater than about 150 micrometers. In some embodiments, the electrochemical cell includes a zinc anode wherein about 4% to about 9% of the zinc-based particles, by weight relative to the total zinc in the electrode, have a particle size of greater than about 150 micrometers.

Figure 14:
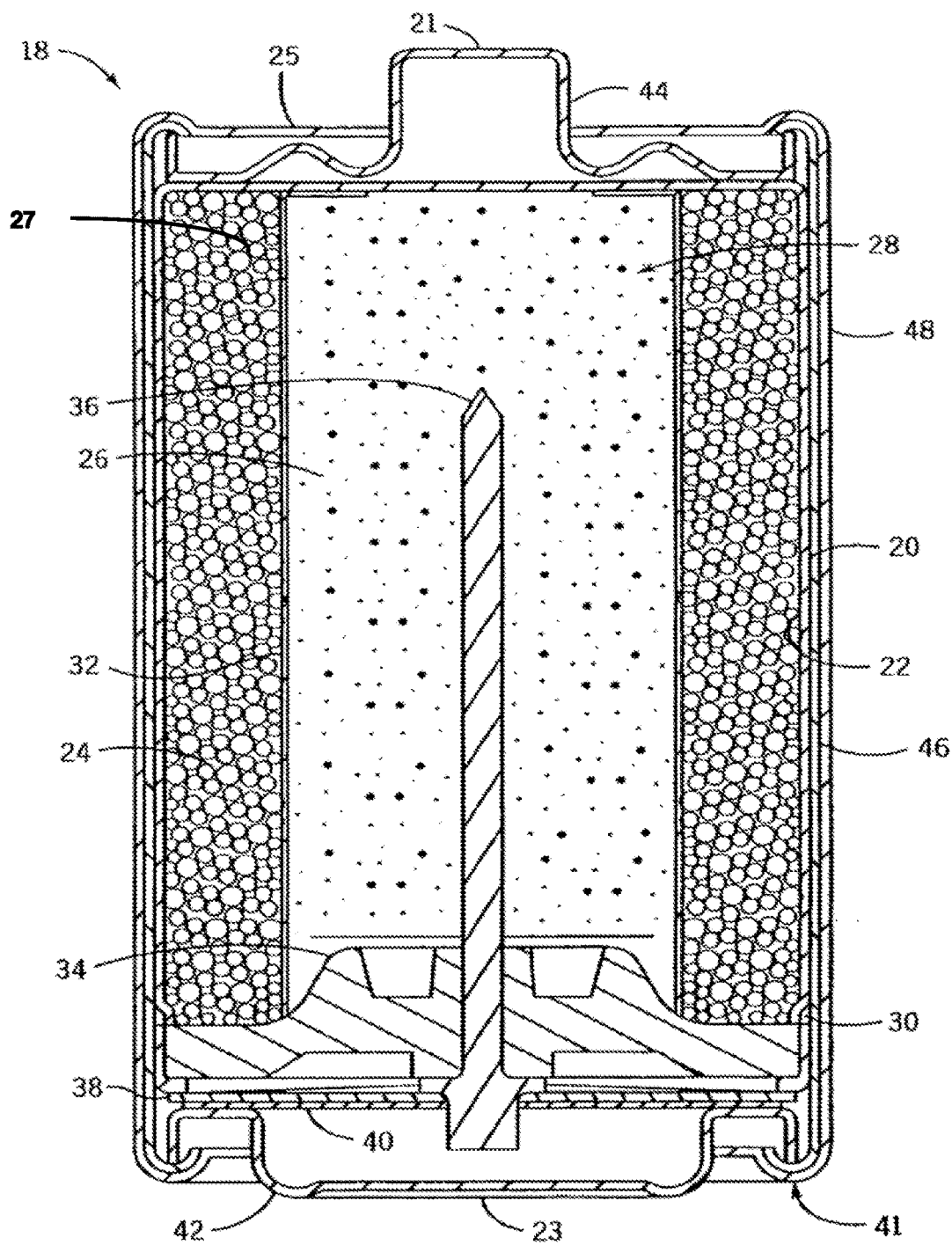
FIG. 14 is a cross-sectional, schematic view depicting an illustrative electrochemical cell of an embodiment of the present disclosure.

An exemplary embodiment of a metal-metal oxide battery cell of the present disclosure may be as illustrated in FIG. 14, although other designs should not be so limited. Referring initially to FIG. 14, an axially extending cylindrical cell 18 has a positive terminal 21, a negative terminal 23, and a positive current collector in the form of an unplated cylindrical steel container 20. Container 20 is initially closed at its positive end 25 proximal the positive terminal 21 and open at its end proximal the negative terminal 23 such that the negative end of container is crimped to close the cell 18 as is understood generally by a skilled artisan.

At least one or more cylindrical annular cathode rings 24, formed such that their outside diameters at their outer peripheral sidewalls are slightly greater than the inside diameter of the positive current collector 20, are forced into the positive current collector. A coating 22, desirably carbon, can be applied to the radially inner surface of container 20 to enhance the electrical contact between the cathode rings 24 and the container. Installation of the cathode rings 24 forms a pressure contact with coating 22. Cathode 24 further presents an inner surface 27 that define a centrally shaped void 28 in a cylindrical cell within which anode 26 is disposed.

A separator 32 is disposed between the anode 26 and cathode 24. Anode 26, which is placed inside of the cathode rings 24, is generally cylindrically shaped, and has an outer peripheral surface which engages the inner surfaces of a separator 32, and comprises gelled zinc in accordance with at least one aspect of the present invention. The separator is disposed adjacent to the inner wall 27 between the cathode 24 and anode 26. An alkaline aqueous electrolyte typically comprising potassium hydroxide and water at least partially wets anode 26, cathode rings 24, and separator 32.

A bead 30 is rolled into the container near the negative end 41 to support a sealing disk 34. The sealing disk 34, having a negative current collector 36 extending therethrough, is placed into the open end of the container 20 and in contact with the bead 30. The negative open end 41 of the container 20 is crimped over the sealing disk 34 thus compressing it between the crimp and the bead 30 to close and seal the cell. An insulation washer 38 with a central aperture is placed over the crimped end of the cell such that the end of the negative current collector 36 protrudes through the aperture. A contact spring 40 is affixed to the end of the negative current collector 36. Negative terminal cap 42 and positive terminal cap 44 are placed into contact with the contact spring 40 and the positive current collector 20, respectively, and an insulating tube 46 and steel shell 48 can be placed around the cell 18 and crimped on their ends to hold the terminal caps in place. It should be appreciated that steel shell 48 and insulating tube 46 could be eliminated to increase the internal volume for the cell that may be occupied by active ingredients. Such an arrangement is described in U.S. Pat. No. 5,814,419 assigned to Rayovac Corporation, the disclosure of which is hereby incorporated by reference herein.

The cathode of the electrochemical cell may include any cathode active material generally recognized in the art for use in alkaline electrochemical cells. The cathode active material may be amorphous or crystalline, or a mixture of amorphous and crystalline. For example, the cathode active material may include, or be selected from, an oxide of copper, an oxide of manganese as electrolytic, chemical, or natural type (e.g., EMD, CMD, NMD, or a mixture of any two or more thereof), an oxide of silver, and/or an oxide or hydroxide of nickel, as well as a mixture of two or more of these oxides or hydroxide. Suitable examples of positive electrode materials include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, $Cu\ Mn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$, or a combination of any two or more thereof.

The electrochemical cell may include a separator between the cathode and the zinc anode, which is designed for preventing short-circuiting between the two electrodes.

Generally, any separator material and/or configuration suitable for use in an alkaline electrochemical cell, and with the cathode and/or anode materials set forth herein above, may be used in accordance with the present disclosure. In one embodiment, the electrochemical cell includes a sealed separator system that is disposed between a gelled anode of the type described here and a cathode. The separator may be made of any alkaline resistant material, including, but not limited to, polyvinyl alcohol, Tencel, mercerized wood pul, polypropylene, polyethylene, cellophane, and combinations thereof. In some embodiments, the separator includes polypropylene.

In another embodiment, the electrochemical may be prepared by any means known in the art, so long as the resulting cell does not conflict with the disclosures presented herein. Thus, the present disclosure includes a method of preparing a electrochemical cell including the components and their respective concentrations as discussed throughout the entirety of this disclosure.

By adjusting the zinc anode particle size distribution to control the content of dust, fines, and coarse size particles as described herein, improved reliability in terms of suppressed cell gassing and cell leakage, along with enhanced high rate discharge capability, may be attained. Advantages of the present technology include for example, maintaining or suppressing cell reliability and cell gassing while simultaneously enhancing high rate discharge performance capabilities, reduction of drop test failures, improvement in battery amperage, close circuit voltage, and decrease in cell impedance. The use of optimized percent amounts of coarse particles minimizes the hydrogen gas formation anticipated with enlarged zinc anode surface area. Another advantage is that with the zinc-based particles of the present technology the electrolyte included in the anode mixture can have a reduced hydroxide concentration. The present technology thus provides improved high rate cell discharge performance by way of anode surface enlargement and the use of low KOH concentrations in the anode gel. Foreign metallic impurities inherent in anode gels may be used as cathode sites to promote reduction reactions leading to gas generation, balanced by the oxidation (corrosion) of the zinc active material. As described above, the particle-to-particle contact between zinc anode particles is enhanced in the presence of coarse particles having a relatively high aspect ratio. Lowering the percentage of coarse particles in the anode gel suppresses the contact to contaminated particles, thereby, minimizing the adverse gassing impact from impurities present in the anode gel.

In one aspect, a method for reducing the gassing of an electrochemical cell subject to gassing is provided, wherein the method includes providing as the active anode of said cell, a gelled anode including zinc-based particles, wherein less than 20% of the zinc-based particles, by weight relative to the total zinc in the electrode, have a particle size of greater than about 150 micrometers while simultaneously limiting the content of dust particles to less than 10% of the zinc-based particles. In some embodiments, the method includes a zinc anode providing as the active anode of said cell, a gelled anode including zinc-based particles, wherein about 10% to about 20% of the zinc-based particles, by weight relative to the total zinc in the electrode, have a particle size of greater than about 150 micrometers. In some embodiments, the method includes providing as the active anode of said cell, a gelled anode including zinc-based particles, wherein about 4% to about 9% of the zinc-based particles, by weight relative to the total zinc in the electrode, have a particle size of greater than about 150 micrometers. In some embodiments, the gassing is reduced from about 10% to about 50%. This includes a reduction in gassing of from about 10% to about 45%, from about 15% to about 40%, from about 20% to about 40%, or from about 30% to about 40%, and ranges between any two of these values or less than any one of these values. In some embodiments, the gassing is reduced from about 10% to about 50% in battery cells having zinc powders containing less than 20% of coarse particles relative to conventional battery cells having an active anode including zinc-based particles with apparent densities between 2.50 and 3.0 g/ml and coarse content having sizes greater than 150 micrometers amounting to between 20% and 60% by weight relative to the total zinc electrode. In some embodiments, less than 20% of the zinc-based particles, by weight relative to the total zinc in the electrode, have a particle size of greater than about 150 micrometers, and less than 10% of the zinc-based particles, by weight relative to the total zinc in the electrode, have a particle size of less than about 45 micrometers.

The present technology recognizes that factors that control cell performance include parameters such as the surface area of the anode, the gel KOH concentration, and the content of inhibitor, among others. Specifically, increasing the active anode electrode surface area provides sufficient active reaction sites needed to keep up with the cathode reaction at high discharge rates. Accordingly, cells are provided having a predetermined amount of zinc metal or alloy particles added to the anode gel. The present technology relates to the use of zinc-based particles having a particle size distribution consistent to provide maximum performance without adverse effects to cell reliability. Thus, in one embodiment, the zinc-based particles may include dust contents of less than approximately 15%, such as less than 7%, by weight relative to the total zinc in the anode, for example, between the range of 2% and 6%, or between the range of 4% and 6%. It may be appreciated that smaller particles further increase the effective surface area of the anode. In other embodiments, the zinc-based particles may include amount of zinc fines greater than 20%, while the zinc-based particles having a size above 150 microns may be present at about less than 20% weight, for example, between about 1% and 9%, between about 10% and 20%, and between about 12% and 18%, by weight of total zinc present in the anode; and the zinc-based particles having a size between 75 microns and 150 microns may be present at the remaining percent fraction of the zinc powder distribution.

The present technology recognizes that alkaline anode gels whose zinc particle size distribution includes coarse particles at percentages described herein minimizes the cell gas generation caused by undesirable corrosion reactions induced by the presence of metallic impurities; and the use of zinc dust and zinc fines particles is intended to enhance surface area and increase high rate discharge performance. The advantages in cell performance may also be enhanced under conditions wherein the anode gel has an electrolyte (KOH) concentration at less than 30%, for example, between 25% and 30%.

Although improved cell performance has been correlated with preferred ranges of zinc dust, fine, and coarse sizes in combination with defined KOH concentrations, one skilled in the art would recognize the benefits of the addition of zinc fines and an optimum KOH concentration, or individually. Accordingly, the present technology includes within its scope the addition of optimum percentages of dust, fines, and coarse particles to an anode gel having zinc particle sizes within any of the above-stated ranges either individually or in combination with any of the above-stated KOH concentrations. Likewise, the present technology includes within its scope an anode gel having a KOH concentration within any of the above-stated ranges either individually or in combination with dust, fines, and coarse particles having a size within any of the above-stated ranges. Also, the above-stated zinc dust, fines, coarse content, and KOH concentrations may be implemented in a cell either alone or in combination with the inhibitors described herein, e.g., a phosphate surfactant and/or inorganic additives.

The present technology, thus generally described, will be understood more readily by reference to the following examples, which are provided by way of illustration and are not intended to be limiting of the present technology.

EXAMPLES

In the Examples presented below, electrochemical cells of the present disclosure were tested for DSC performance, drop test amperage (both before and after the drop), partial discharge cell gassing, undischarged cell gassing, and conditions after storage. Gelled anodes were prepared in accordance with the improvements of the present disclosure.

Gel viscosity is measured using Brookfield digital viscometer and Teflon-coated spindle #06 at 4 rpm. When measuring, allow the reading to stabilize over 5 minutes before recording the viscosity value.

For yield stress value measurement, measuring the gel viscosity values at 1.0 rpm (R1) and 0.5 rpm (R2) respectively, the yield stress value is calculated using the formula: yield stress value=(R2−R1)/100.

Measurement of Cell Gassing

FIG. 1 shows a plot of cell gassing from LR6 (AA) alkaline cells after partial discharge and storage at 160° F. for one week. Partial discharge for this cell size was carried out at a constant current of 250 mA for 1.80 hours, after which the cells were stored in a dry oven at 160° F. The anode gels of the LR6 cells had a gel KOH concentration at 26.5% and the corresponding zinc loading was at 70%, relative to the weight of the gel. The zinc powder had bismuth and indium as main alloying elements at a concentration of about 200 ppm and the corresponding apparent densities ranged between 2.73 and 2.79 g/ml. Along with RM510 at a concentration of 35 ppm, an additional inorganic inhibitor was also tested to determine its impact on performance and reliability. The data in FIG. 1 compares the cell gassing of cells made with zinc powders having a coarse content at 15% and 18% (and fines contents at 28% and 34%, respectively), relative to the cell gassing of control cells made with a zinc powder having a coarse content at 41% (and fines content at 17%). At least about 10% in cell gas suppression is observed relative to the control cell having 41% of coarse particles, as observed with cells containing RM510 of organic inhibitor.

Measurement of DSC Performance

Figure 2:
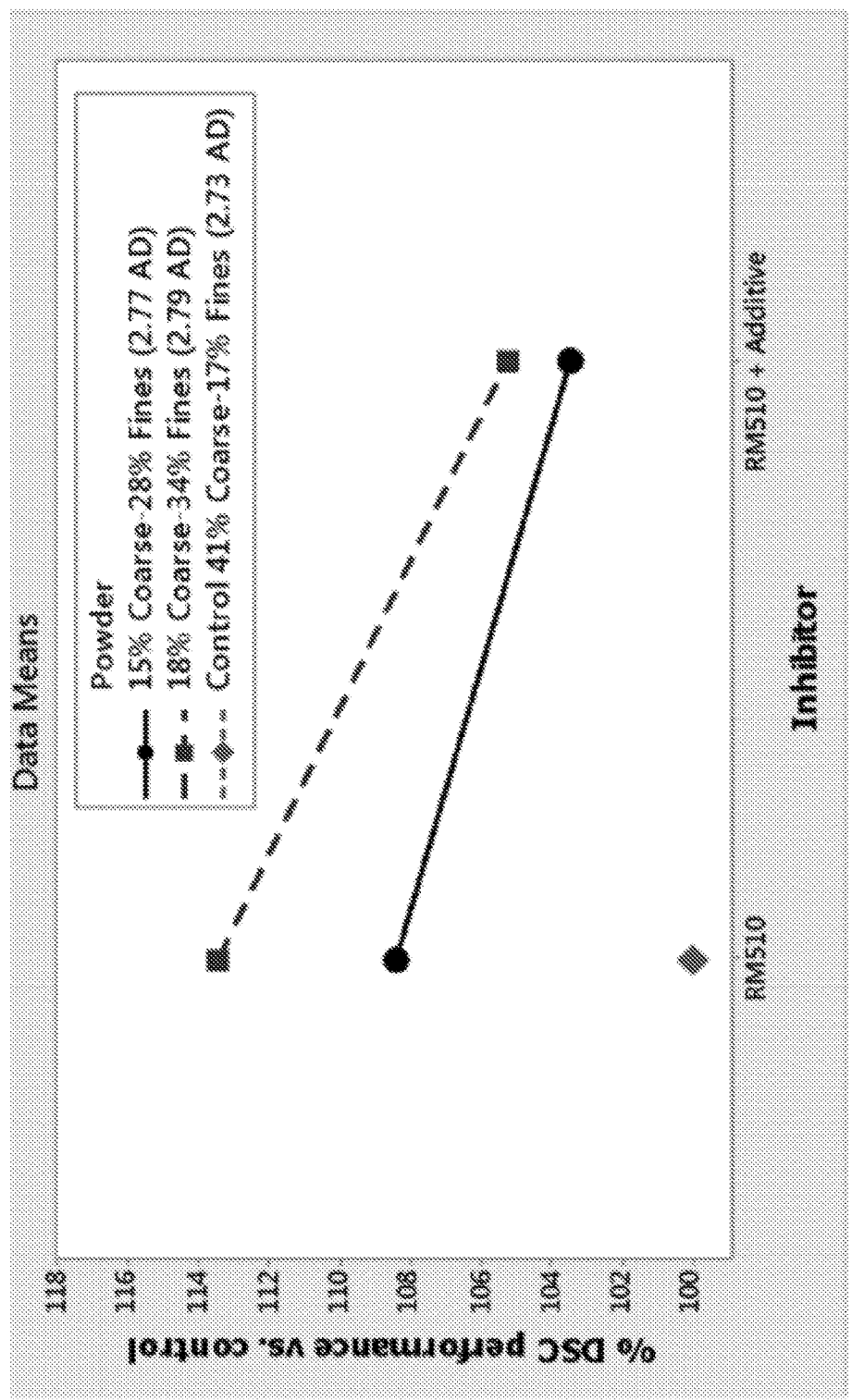
FIG. 2 depicts the digital still camera (DSC) performance of the cell described in FIG. 1.

Electrochemical cells may be tested in accordance with several methods under the American National Standards Institute (ANSI). These tests include determining cell performance/longevity under cell pulse discharge (i.e., repeated application of 1500 mW for a period of 2 seconds and 650 mW for a period of 28 seconds during a period of five minutes every hour until the cell voltage reaches the end point voltage of 1.05 V). The described test is known as the digital still camera (DSC). DSC test data corresponding to cells described in FIG. 1 is shown in FIG. 2. As seen from FIG. 2, the DSC performance of cells having zinc coarse content at 15% and 18% increased by about 8% and 14% relative that of control cells having zinc with coarse content at 41%. The increased performance is attributed to the higher fines content (28% and 34%) relative to that of control (17%). Despite the higher content of fine particles at 28% and 34%, the respective cell gassing was smaller than that of to control cells having 17% of fines particles (41% of coarse content). The data in FIGS. 1 and 2 indicates that the presence of an additional inorganic inhibitor (labeled additive) tends to suppress cell gassing at the expense of suppressing discharge performance.

Figure 3:
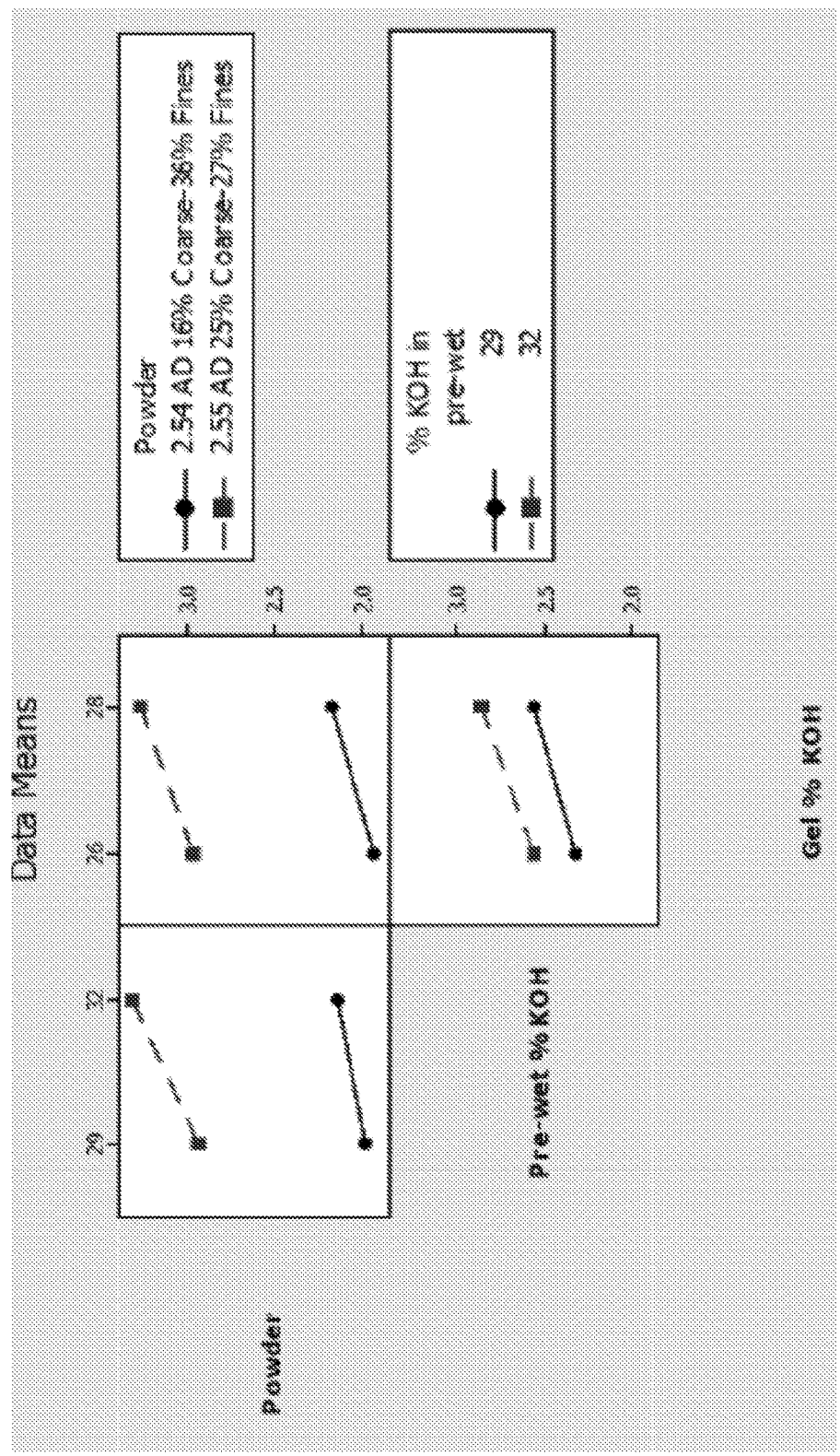
FIG. 3 illustrates the partial discharge cell gassing characteristics of a LR6 electrochemical cell caused by the content of coarse and fine zinc-based particles having an apparent density of about 2.55 g/ml.
Figure 4:
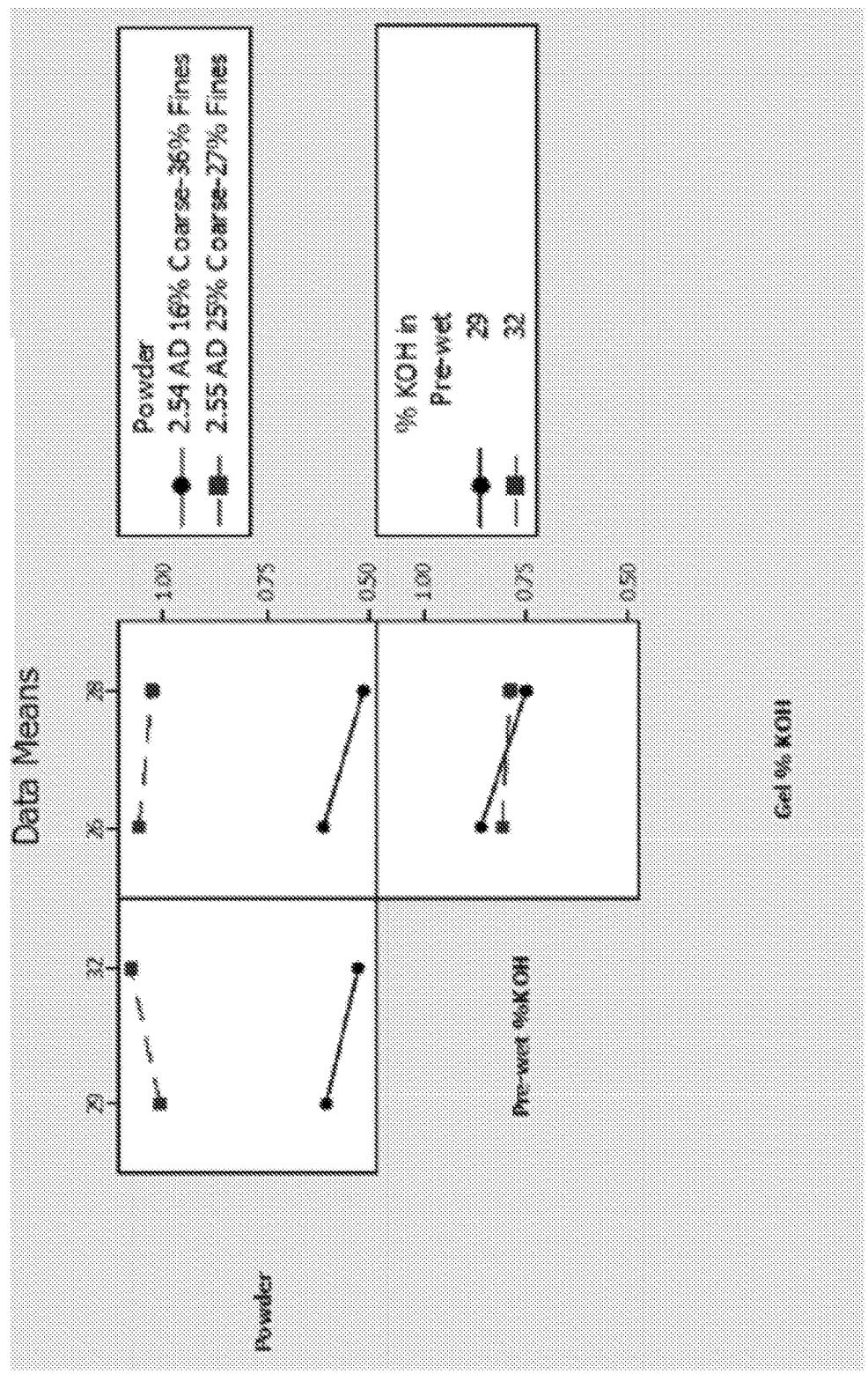
FIG. 4 depicts undischarged cell gassing of LR6 cells as described in FIG. 3.
Figure 5:
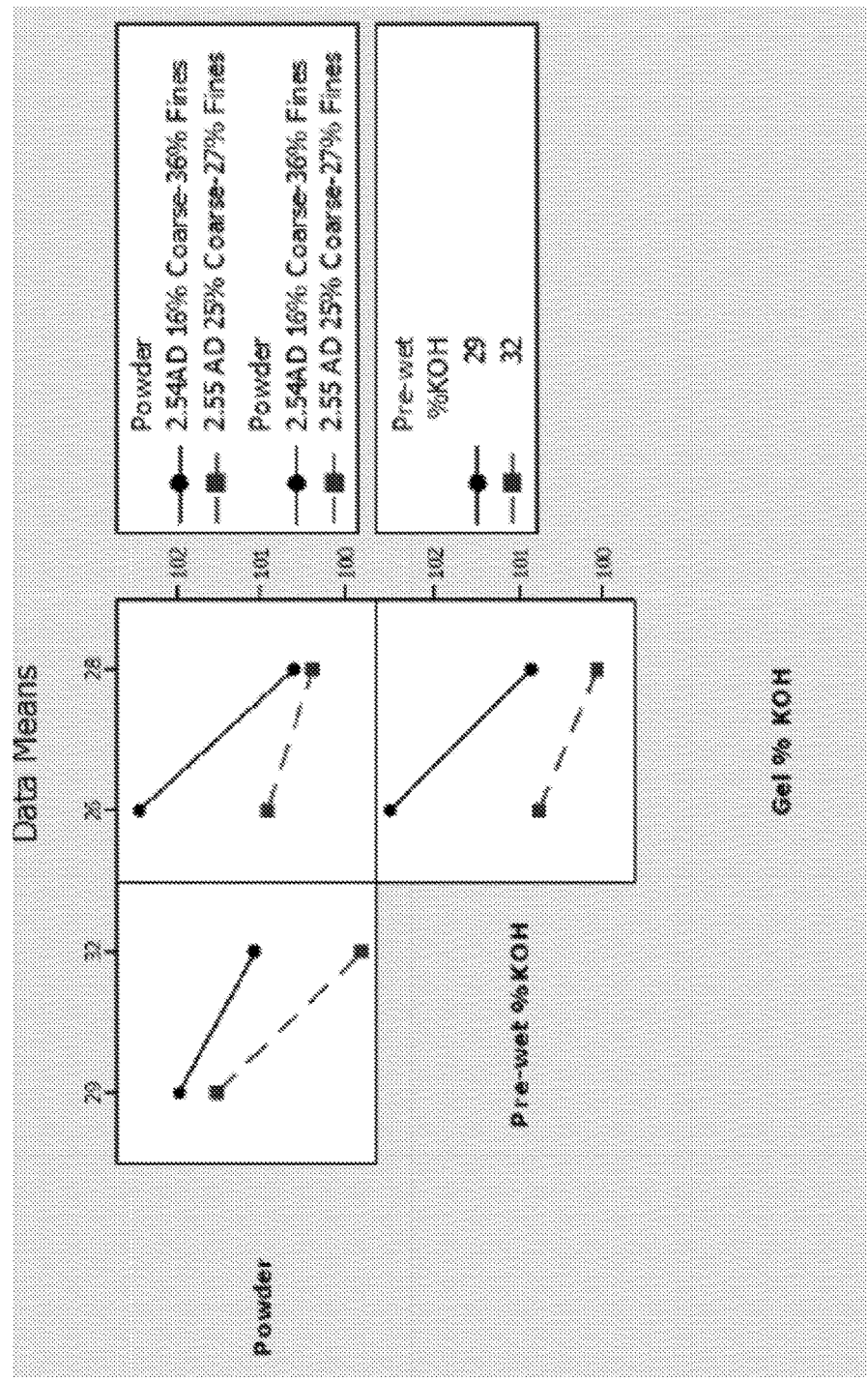
FIG. 5 depicts the DSC performance of the cells described in FIGS. 3 and 4.

FIG. 3 and FIG. 4 summarize partial discharge and undischarged cell gassing measured from LR6 cells stored at 160° F. for one week. The respective gel KOH concentration was at 26% and the zinc loading was at 70%. The alloy powder contained 200 ppm bismuth and 200 ppm indium and the apparent density of the powders was at about 2.55 g/ml. The inhibitor concentration in the anode gel was at 46 ppm RM510. In agreement with the gassing results observed in FIG. 1, the cell gassing data displayed in FIGS. 3 and 4 indicate suppressed cell gassing with the powder having a low coarse content such as 16%, relative to the control powder with higher level of coarse content, such as 25%, irrespective of being under the undischarged (FIG. 4) or partially discharged (FIG. 3) conditions. The gassing suppression is as much as 33% after partial discharge and as much as 50% when the cells are stored undischarged. FIG. 5 shows the corresponding performance data for cells whose gassing results are displayed in FIGS. 3 and 4. Equal or improved performance is seen from cells with the powders having 16% of coarse particles, particularly at the low gel KOH concentration of 26%.

Figure 6:
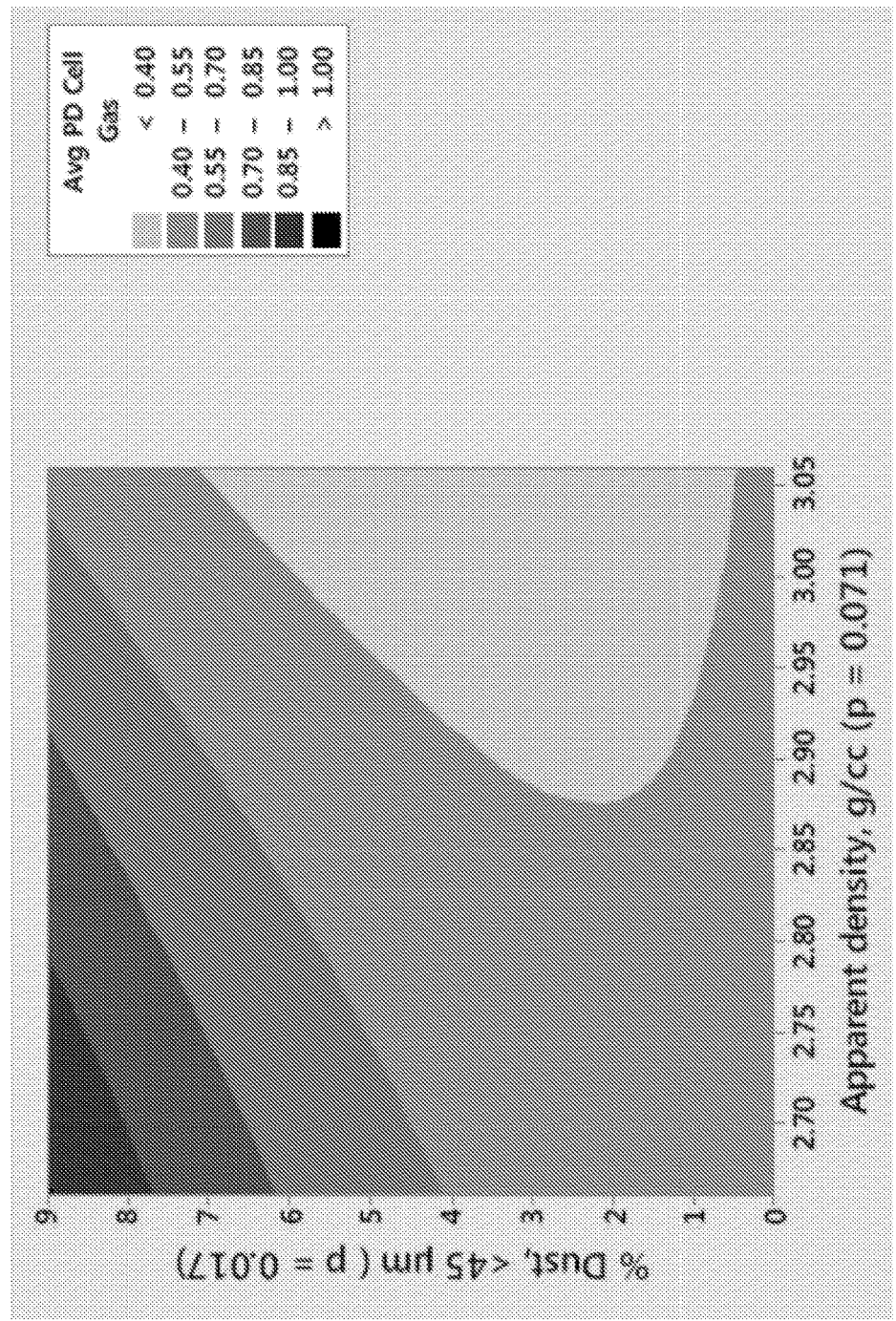
FIG. 6 illustrates a contour plot showing the dependence of LR6 partial discharge (PD) cell gassing on the content of dust (particles smaller than 45 μm) and the apparent density (g/ml) of the zinc powder.

FIG. 6 displays a contour plot of partial discharge cell gassing of LR6 cells as determined by dust content and apparent density of zinc powders. The composition of the anode gel included a KOH concentration of 26.5%, zinc loading at 70%, RM510 content at 35 ppm, and the zinc alloy contained bismuth and indium at 200 ppm. The data in FIG. 6 suggests that partial discharge cell gassing may be minimized to below 0.70 ml at dust contents below 6% and apparent densities as low as 2.66 g/ml. In FIG. 6, the significance of each plotted factor, % dust and apparent density, is given by their respective p values which reflect a probability concept. A p value of 0.017, corresponding to the % dust factor, can be interpreted as having a 98.3% probability that the PD cell gassing plot will follow the contour lines defined by the % dust levels as depicted in FIG. 6.

Figure 7:
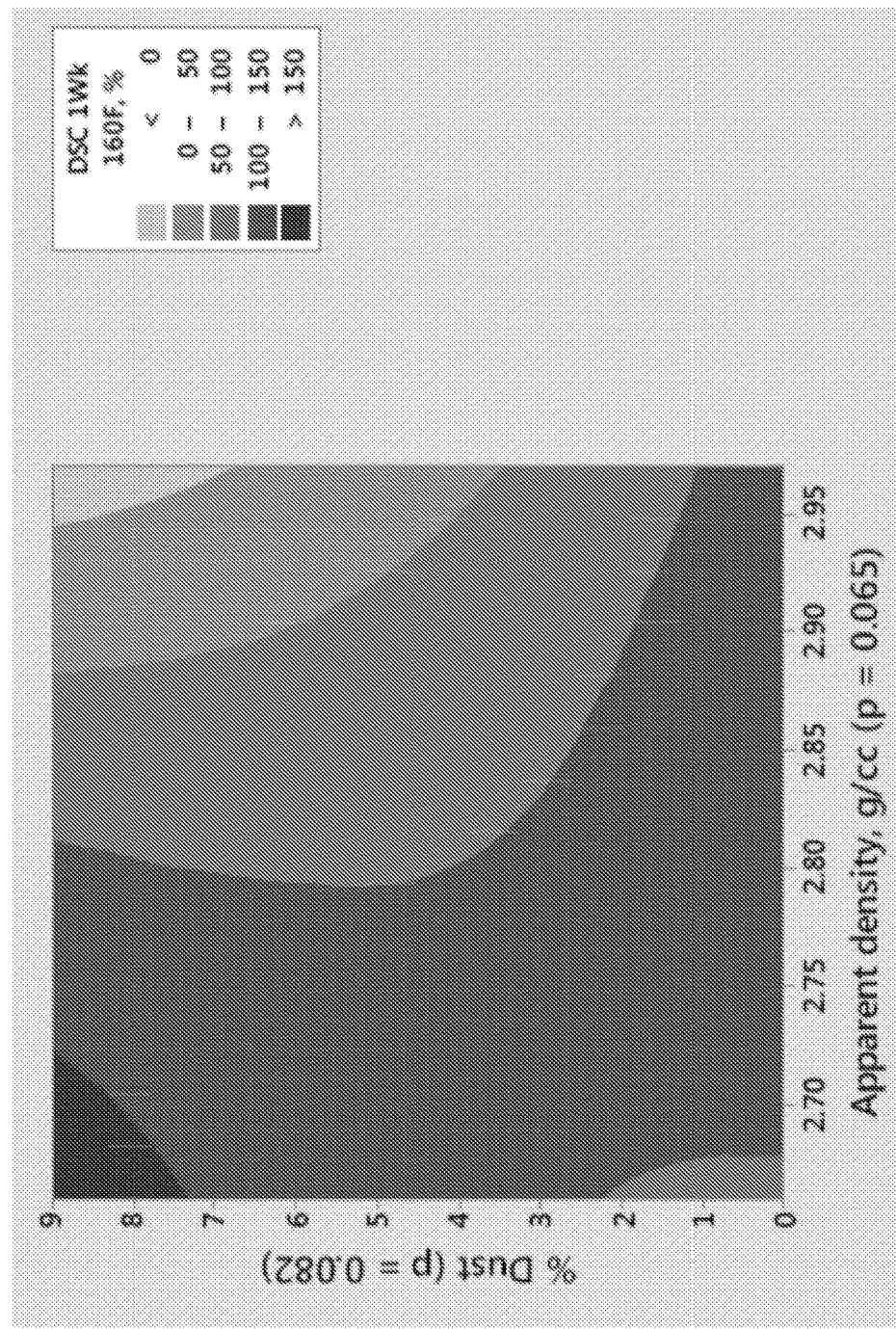
FIG. 7 illustrates a contour plot to show the dependence of LR6 DSC performance on the content of dust (particles smaller than 45 um) and the apparent density of the zinc powder after storing the cells for one week at 160° F.

FIG. 7 illustrates the percentage DSC performance of LR6 cells after storage for one week at 160° F. as determined by dust content and zinc apparent density. A control cell with 0% dust and 52% coarse content was used as reference and was assumed to be at 100% performance. Best DSC results are seen at the highest dust content and lowest apparent density such as 9% and 2.66 g/ml, respectively.

Figure 8:
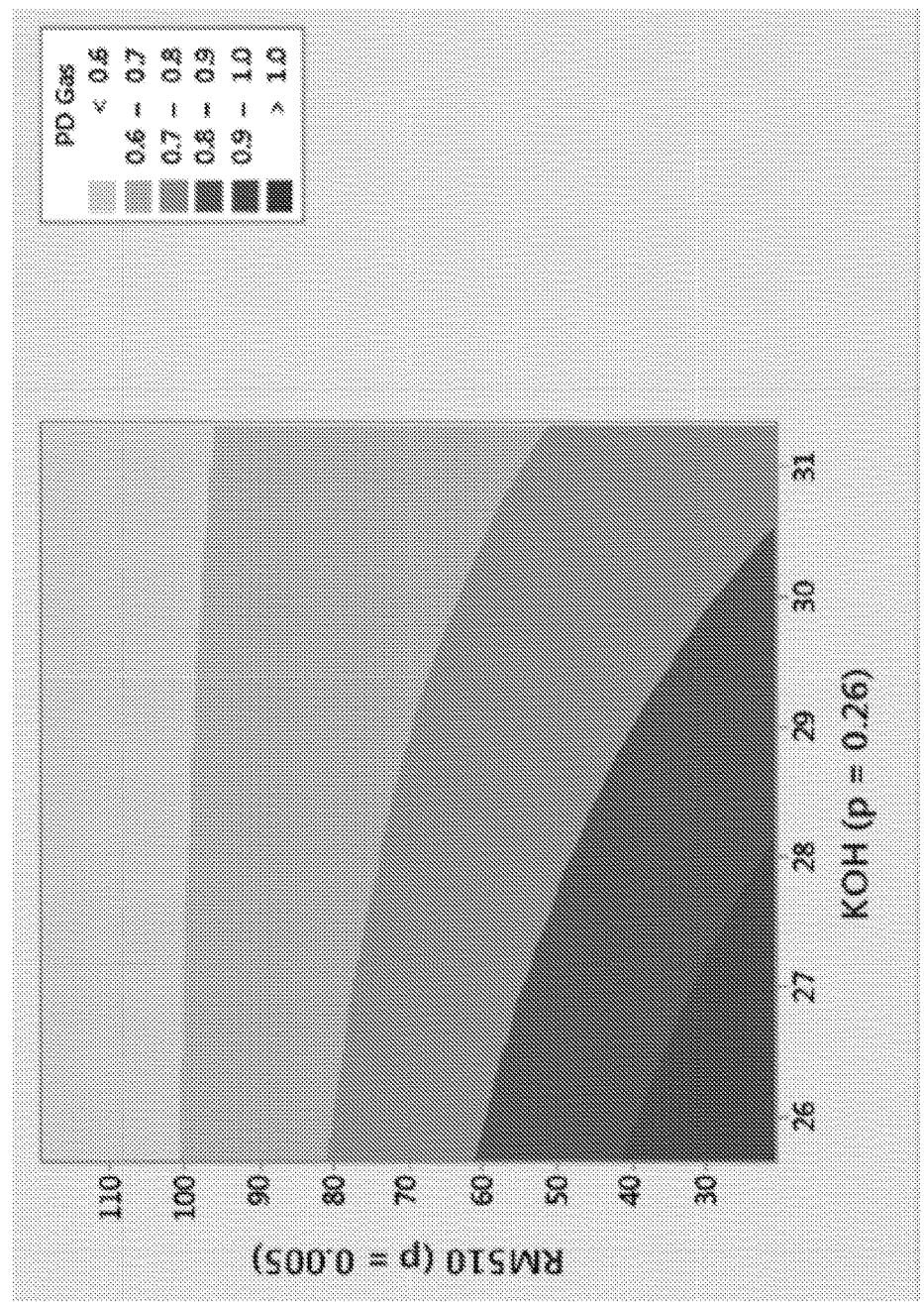
FIG. 8 illustrates the dependence of LR6 PD cell gassing on surfactant content and gel KOH concentration.
Figure 9:
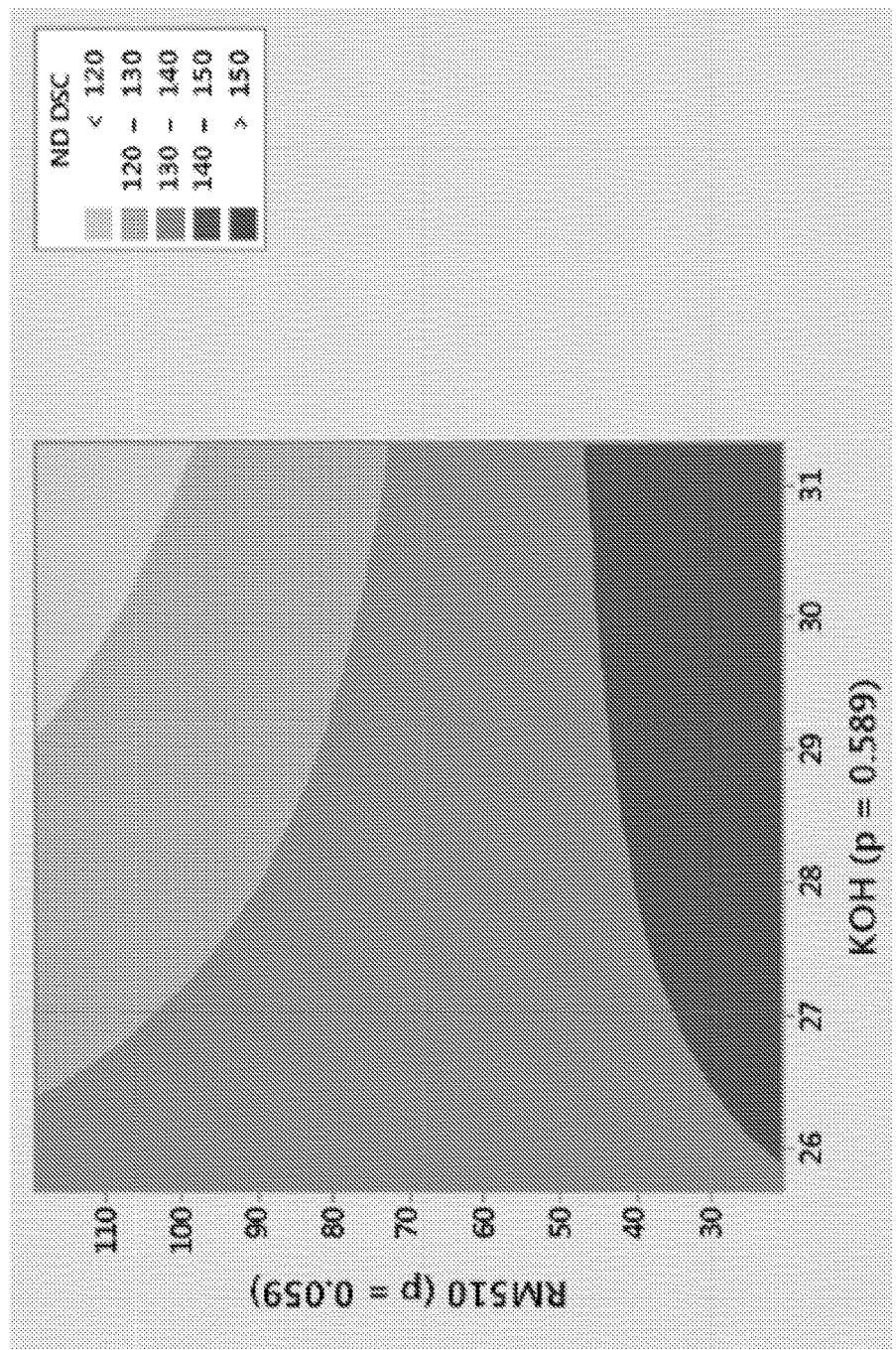
FIG. 9 illustrates DSC performance dependence of surfactant content and gel KOH concentration as described in FIG. 8.

FIG. 8 illustrates the partial discharge (PD) cell gassing results of LR6 cells having a zinc powder of apparent density at 2.72 g/ml containing bismuth and indium alloying elements at about 200 ppm. Cell gassing was measured under various conditions of KOH concentration and under various amounts of RM-510 added to the anode. It is observed that the PD cell gassing is increased as the concentration of RM510 is decreased from 120 to 20 ppm. Highest PD cell gassing is evident at the lowest content of RM510. The corresponding DSC performance is shown in FIG. 9. The present technology thus recognizes that performance advantages may be achieved at optimum concentrations of RM510 and KOH.

Figure 10:
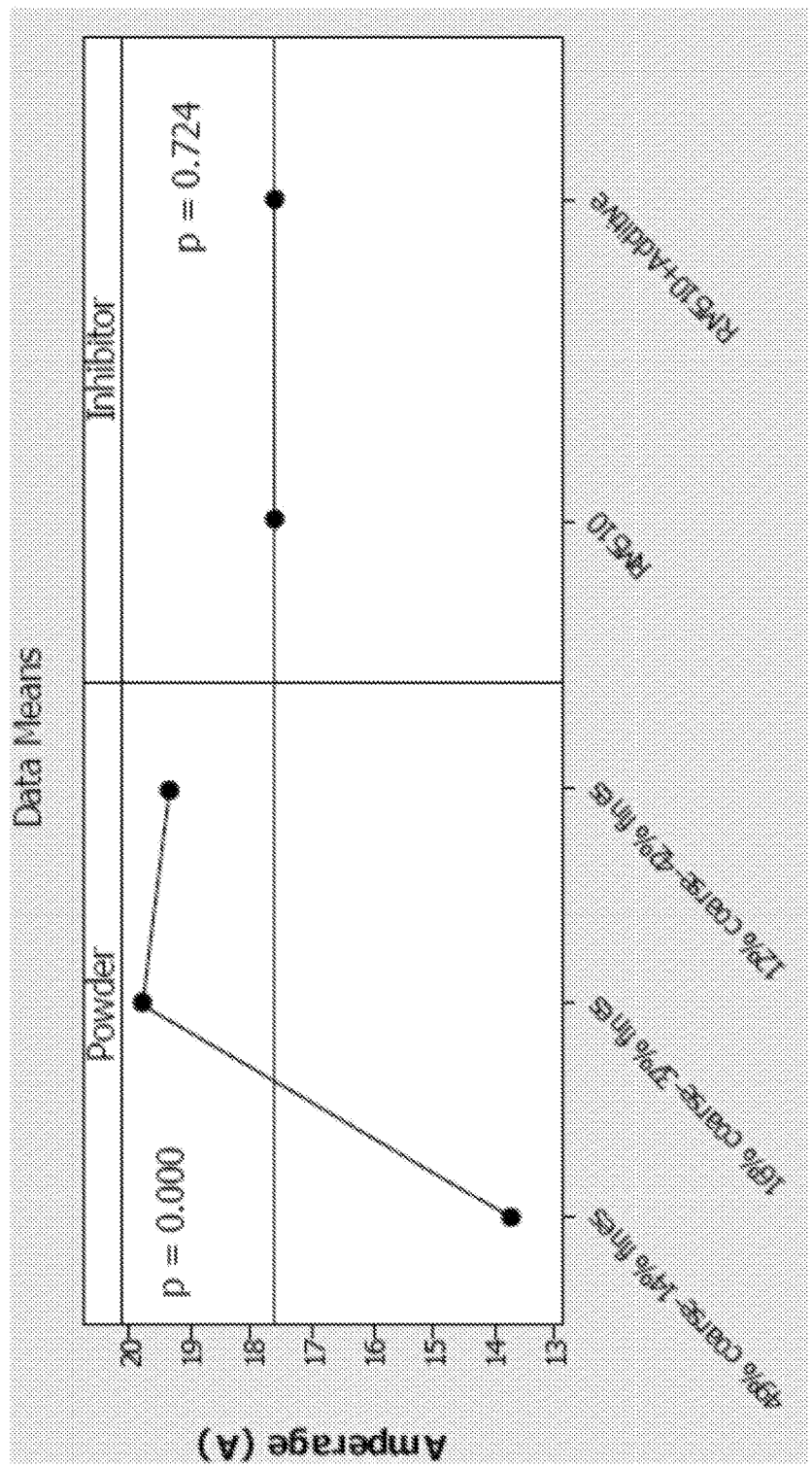
FIG. 10 is a graph illustrating amperage of LR20 cells as impacted by the content of coarse and fines particles.
Figure 11:
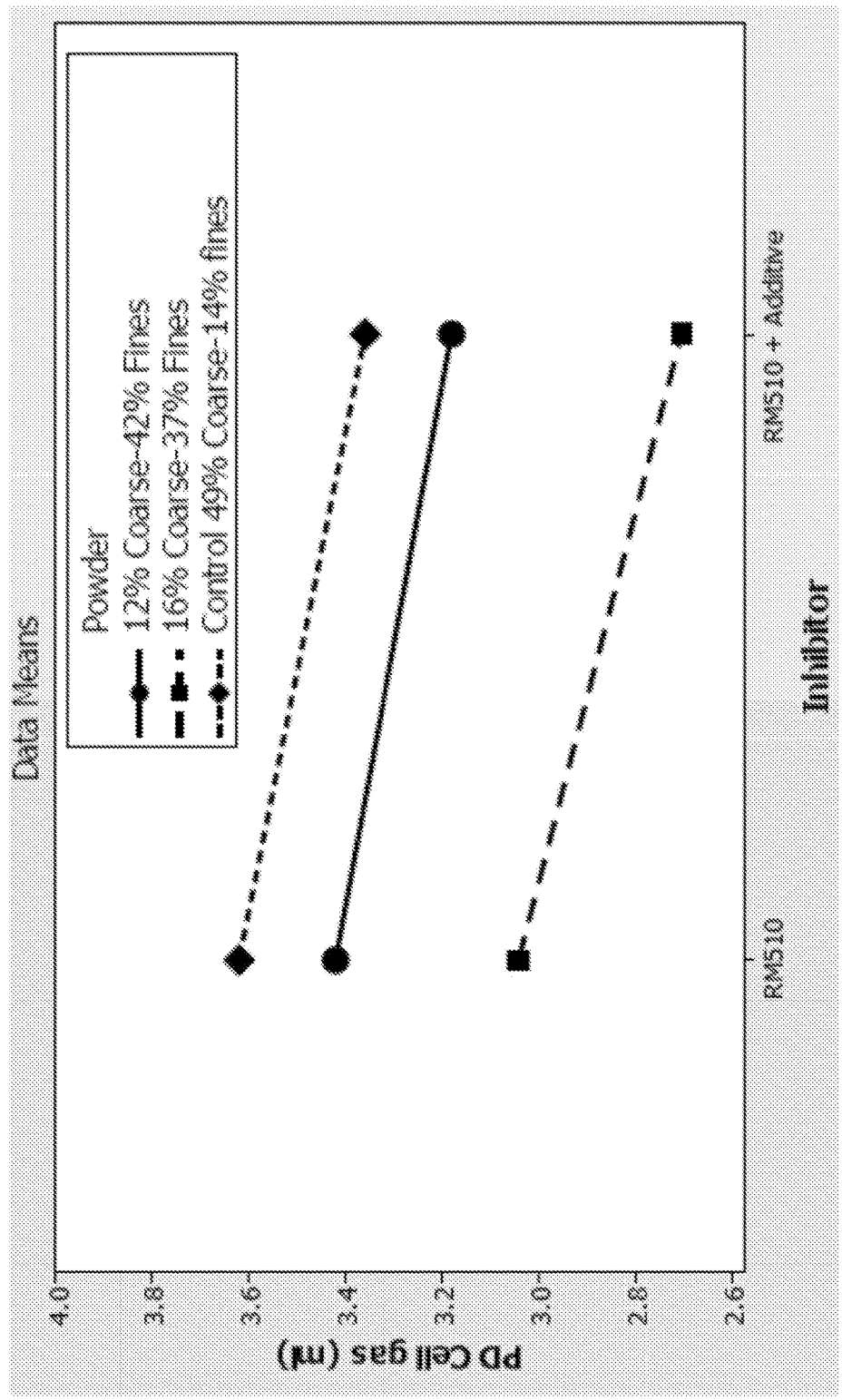
FIG. 11 is a graph illustrating partial discharge cell gassing of LR20 cells as described in FIG. 10.

The present technology recognizes that the use of anode zinc powders with coarse content below 20% and fines content greater than that of conventional zinc anode powders enhances cell amperage and close circuit voltage, as well as reduces cell impedance, thus promoting improved resistance to physical tests such as the drop test. LR20 cells were prepared wherein the anode included a zinc alloy including bismuth and indium at about 150-200 ppm, RM510 surfactant at a concentration of about 60 ppm, and gel KOH with a concentration of about 32%. FIG. 10 illustrate cell amperage of the LR20 cells for conventional control cells having 49% of coarse-14% of fines content, as compared to the amperage of LR20 cells containing 16% coarse-37% fines and 12% coarse-42% fines. It is observed that, despite the relative high content of fine particles (37% and 42%), the cells having low coarse content (12% and 16%) exhibited cell gassing nearly equal or lower than that of control cells with low fines content (14%), as shown in FIG. 11. The partial discharge with LR20 cells was done at 600 mA for 11.0 hours.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A gelled anode for an alkaline battery cell comprising, the gelled anode comprising:
a gelling agent;
an alkaline electrolyte comprising a hydroxide material;
a surfactant; and
zinc-based particles, wherein less than 20% of the zinc-based particles, by weight relative to the total zinc in the electrode, have a particle size of greater than about 150 micrometers;
wherein the zinc-based particles have an aspect ratio of from about 1.85 to about 4.15 and an apparent density of about 2.40 g/cm$^3$ to about 3.15 g/cm$^3$.

2. The gelled anode of claim 1, wherein about 10% to about 20% of the zinc-based particles, by weight relative to the total zinc in the electrode, have a particle size of greater than about 150 micrometers.

3. The gelled anode of claim 1, wherein the zinc-based particles have a roundness of at least 1.5.

4. The gelled anode of claim 1, wherein the zinc-based particles are zinc alloy particles having an average particle size of about 100 micrometers to about 130 micrometers.

5. The gelled anode of claim 1, wherein about 20% to about 70% of the zinc-based particles, by weight relative to the total zinc in the electrode, have a particle size of less than about 75 micrometers.

6. The gelled anode of claim 5, wherein about 20% to about 45% by weight relative to the total zinc in the electrode have a particle size of less than about 75 micrometers, about 1% to about 10% by weight relative to the total zinc in the electrode have a particle size of less than about 45 micrometers, and about 10% to about 20% by weight relative to the total zinc in the electrode, have a particle size of greater than about 150 micrometers.

7. The gelled anode of claim 1, wherein the hydroxide is potassium hydroxide.

8. The gelled anode of claim 1, wherein the surfactant is an organic phosphate ester surfactant, a polyethylene glycol ether, an ethoxylated alkylphenol, a tallow amine, diethylenetriamine, an amphoteric surfactant, a sulfonated organic acid surfactant, a sulfated organic acid surfactant, hexyl diphenyl oxide sulfonic acid, Rhodafac RM-510, Rhodafac RA-600, Rhodafac RS-610, Witconate 1840X, Mafo 13 MOD1, or a combination of any two or more thereof.

9. The gelled anode of claim 1, wherein the surfactant is present at a concentration ranging from between 0.0010% and 0.040% relative to the weight of the gelled anode.

10. The gelled anode of claim 1, having a yield stress value of about 600 to about 3500.

11. The gelled anode of claim 1, having a viscosity of about 25000 cps to about 150000 cps.

12. An alkaline electrochemical cell comprising:
a positive current collector;
a cathode in contact with the positive current collector;
a negative current collector;
a gelled anode according to claim 1 in contact with the negative current collector
and
a separator between the cathode and the anode.

13. A method for reducing the gassing of an electrochemical cell subject to gassing, the method comprising:
providing as the active anode of said cell, a gelled anode comprising:
a gelling agent;
an alkaline electrolyte comprising a hydroxide material;
a surfactant; and
zinc-based particles;
wherein:
less than 20% of the zinc-based particles, by weight relative to the total zinc in the electrode, have a particle size of greater than about 150 micrometers, and less than 10% of the zinc-based particles, by weight relative to the total zinc in the electrode, have a particle size of less than about 45 micrometers; and
the zinc-based particles have an aspect ratio of from about 1.85 to about 4.15 and
an apparent density of about 2.40 g/cm$^3$ to about 3.15 g/cm$^3$.

14. The method of claim 13, wherein the gassing is reduced by about 10% to 50% in battery cells having zinc powders containing less than 20% of coarse particles relative to cells having an active anode comprising zinc-based particles at apparent densities between 2.50 and 3.0 g/ml and coarse content (>150 micrometers) between 20% to 60% by weight relative to the total zinc electrode.

\* \* \* \* \*